(12) United States Patent
Yu et al.

(10) Patent No.: US 8,998,774 B2
(45) Date of Patent: Apr. 7, 2015

(54) BRAKE APPLY AND RELEASE DETECTION FOR STOP/START VEHICLE

(75) Inventors: Hai Yu, Canton, MI (US); Mathew Alan Boesch, Plymouth, MI (US); Ryan McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 224 days.

(21) Appl. No.: 13/600,804

(22) Filed: Aug. 31, 2012

(65) Prior Publication Data

US 2014/0066255 A1   Mar. 6, 2014

(51) Int. Cl.
*B60W 10/04* (2006.01)
*B60W 10/18* (2012.01)
*F02D 9/06* (2006.01)
*F02N 11/08* (2006.01)

(52) U.S. Cl.
CPC ........ *F02N 11/0822* (2013.01); *F02N 11/0833* (2013.01); *F02N 11/0837* (2013.01); *F02N 2200/102* (2013.01); *F02N 2200/124* (2013.01); *Y02T 10/48* (2013.01); *Y10T 477/87* (2013.01)

(58) Field of Classification Search
USPC ......... 477/182, 183, 185, 199, 200, 203, 900, 477/901
See application file for complete search history.

(56) References Cited

U.S. PATENT DOCUMENTS

| | | | |
|---|---|---|---|
| 6,135,920 A * | 10/2000 | Kamiya et al. | 477/185 |
| 6,404,072 B2 | 6/2002 | Onoyama et al. | |
| 7,516,007 B2 | 4/2009 | Tamai et al. | |
| 8,382,642 B2 * | 2/2013 | Saito et al. | 477/185 |
| 2008/0262691 A1 | 10/2008 | Ludwig et al. | |
| 2010/0076634 A1 | 3/2010 | Brigham | |
| 2010/0175936 A1 | 7/2010 | Schneider | |
| 2011/0071001 A1 * | 3/2011 | Yu et al. | 477/203 |
| 2011/0136625 A1 | 6/2011 | Yu et al. | |
| 2011/0202249 A1 | 8/2011 | Pothin et al. | |

FOREIGN PATENT DOCUMENTS

DE   102007016987 A1   10/2008
DE   102009002952 A1   2/2011

* cited by examiner

*Primary Examiner* — Justin Holmes
(74) *Attorney, Agent, or Firm* — David B. Kelley; Brooks Kushman P.C.

(57) ABSTRACT

A vehicle is provided with an engine that is configured for automatic shutdown and restart. The vehicle is also provided with a controller that is configured to shutdown the engine in response to brake effort exceeding a first threshold and to restart the engine in response to brake effort decreasing below a second threshold. The first threshold and the second threshold are based on an estimated vehicle mass and a road gradient.

16 Claims, 8 Drawing Sheets

BRAKE APPLY AND RELEASE DETECTION FOR STOP/START VEHICLE

TECHNICAL FIELD

One or more embodiments relate to a vehicle system and method for controlling engine shutdown and restart based on brake apply and release detection.

BACKGROUND

During travel of an engine-powered vehicle, there are many instances when the vehicle must stop before a destination is reached. This may occur, for example, when the vehicle stops at traffic signals, cross-walks, stop signs and the like. A micro-hybrid vehicle may enable a stop/start strategy for starting and stopping the vehicle engine during a driving event. The engine is shutdown if no power is required (e.g. while waiting at a traffic light). As soon as power is requested, the engine is automatically restarted. By avoiding unnecessary engine idling, the vehicle's fuel economy will be improved. For this reason, it is desirable to use the engine shutdown function as much as possible when certain engine stop conditions are satisfied.

A micro-hybrid having a start/stop engine may use a number of factors to determine when to shutdown and restart the engine to achieve the goal of reducing fuel consumption and emissions while the vehicle is stationary. Typically, the engine is shutdown when wheel speed is zero and the brake pedal is depressed. Other considerations may include the engine coolant temperature, battery state of charge, fuel rail pressure, A/C operation, and others that may be used to prevent an engine shutdown and/or to initiate an engine restart. Physical limits of the start/stop system associated with engine/transmission inertia, starter design, combustion control limits, etc., may also impose constraints on the time required to shutdown and restart the engine. This time may adversely impact vehicle launch performance after an engine shutdown, particularly in vehicles with an automatic transmission. As such, it is desirable in some cases to avoid shutting the engine off, or restarting the engine in anticipation of a vehicle launch to improve launch performance.

SUMMARY

In one embodiment, a vehicle is provided with an engine that is configured for automatic shutdown and restart. The vehicle is also provided with a controller that is configured to shutdown the engine in response to brake effort exceeding a first threshold and to restart the engine in response to brake effort decreasing below a second threshold. The first threshold and the second threshold are based on an estimated vehicle mass and a road gradient.

In another embodiment, a vehicle system is provided with a controller that is configured to shutdown an engine in response to brake effort exceeding a first threshold, and to restart the engine in response to brake effort being less than a second threshold. The second threshold is greater than the first threshold, and the second threshold corresponds to the brake effort at which the engine was shutdown.

In yet another embodiment, a method is provided for controlling automatic shutdown and restart of an engine. The engine is shutdown in response to brake pressure exceeding a first threshold based on an estimated vehicle mass and a road gradient. The engine is restarted in response to brake pressure decreasing below a second threshold.

As such, the vehicle, vehicle system and method provide advantages by anticipating a vehicle hold request based on an evaluation of a number of brake apply state conditions, and by anticipating a vehicle launch request based on an evaluation of a number of brake release conditions. By evaluating a number of conditions concurrently, the system avoids unintended engine shutdowns and unintended engine restarts, which improves vehicle fuel economy as compared to existing systems. The vehicle system also promptly responds to intended engine restarts such that the vehicle launch performance is improved and powertrain preparation time delays are minimized.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
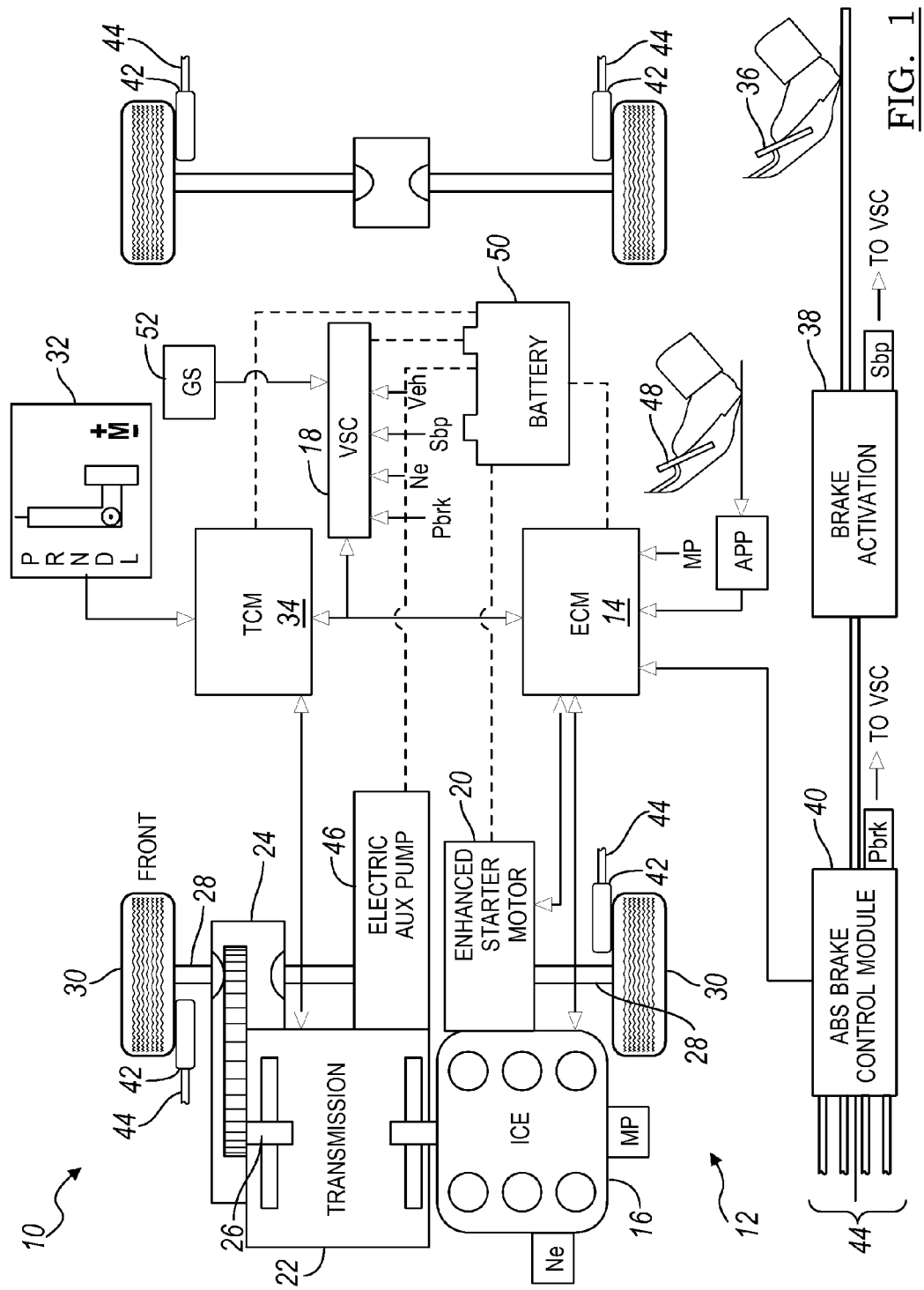
FIG. 1 is a schematic diagram of a vehicle system for controlling engine shutdown and restart based on brake apply and release detection according to one or more embodiments.

With reference to FIG. 1, a vehicle system for controlling engine shutdown and restart based on brake apply and release detection is illustrated in accordance with one or more embodiments and is generally referenced by numeral 10. The vehicle system 10 is depicted within a vehicle 12. The vehicle system 10 includes a controller, such as an engine control module (ECM) 14, an internal combustion engine (ICE) 16 and a vehicle system controller (VSC) 18 that are in communication with each other. The VSC 18 receives input that corresponds to brake system characteristics and communicates with the ECM 14 to control the shutdown and restart of the engine 16.

The illustrated embodiment depicts the vehicle 12 as a micro-hybrid vehicle, which is a vehicle that is propelled by the engine 16, and the engine 16 is repeatedly started and stopped to conserve fuel. An enhanced starter motor 20 is coupled to an engine crankshaft. The starter motor 20 receives electrical power and provides output torque to the crankshaft for starting the engine 16.

The vehicle 12 includes a transmission 22 for adjusting the output torque of the engine 16. Torque from the engine 16 is transferred through the transmission 22 to a differential 24 by a transmission output shaft 26. Axle half shafts 28 extend from the differential 24 to a pair of driven wheels 30 to provide drive torque for propelling the vehicle 12.

The vehicle 12 includes a shifter 32 for manually selecting a transmission gear. The shifter 32 includes a sensor (not shown) for providing an output signal that corresponds to a selected transmission gear (e.g., PRNDL). A transmission control module (TCM) 34 communicates with the shifter 32 and the transmission 22 for adjusting the transmission gear ratio based on the shifter selection. Alternatively the shifter 32 may be mechanically connected to the transmission 22 for adjusting the transmission gear ratio.

The vehicle 12 includes a braking system which includes a brake pedal 36, and a booster and a master cylinder which are generally referenced by brake activation block 38 in FIG. 1. The braking system also includes an ABS brake control module 40 that is connected to wheel brake assemblies 42 and the brake activation block 38 by a series of hydraulic lines 44 to effect friction braking. The wheel brake assemblies 42 are oriented at each wheel 30 and may be configured as caliper, or drum brake assemblies.

The braking system also includes sensors for providing information that corresponds to current brake characteristics. The braking system includes a position switch for providing a brake pedal state ($S_{bp}$) signal that corresponds to a brake pedal position (e.g., applied or released). In other embodiments, the braking system includes a position sensor (not shown) for measuring pedal position. The braking system also includes one or more sensors for providing output indicative of a braking effort or brake torque. In one or more embodiments the brake torque may be derived from another sensor measurement. In the illustrated embodiment, the sensors include pressure sensors for providing a brake pressure ($P_{brk}$) signal that corresponds to an actual brake pressure value within the brake system (e.g., brake line pressure or master cylinder pressure).

The vehicle 12 includes an accelerator pedal 48 with a position sensor for providing an accelerator pedal position (APP) signal that corresponds to a driver request for propulsion. The ECM 14 controls the throttle of the engine 16 based on the APP signal.

The vehicle 12 includes an energy storage device, such as a battery 50. The battery 50 supplies electrical energy to the vehicle controllers, and the starter motor 20, as generally indicated by dashed lines in FIG. 1. The vehicle 12 may include a single battery 50, such as a conventional low voltage battery, or multiple batteries, including a high voltage battery. Additionally, the vehicle 12 may include other types of energy storage devices, such as capacitors or fuel cells.

The vehicle 12 also includes a gradient sensor 52 which provides a signal (GS) that is indicative of a gradient or slope of a road. In one or more embodiments, the gradient sensor 52 is an accelerometer that provides GS based in part on a gravity force component. In other embodiments, the gradient sensor 52 is an inclinometer. In one embodiment, the vehicle system includes a road grade estimator or algorithm that determines road gradient based on GS. In other embodiments, the vehicle includes a navigation system (not shown) that provides signals that may be used for road gradient estimation.

The VSC 18 communicates with other vehicle systems, sensors and controllers for coordinating their function. As shown in the illustrated embodiment, the VSC 18 receives a plurality of input signals (e.g., $S_{bp}$, $P_{brk}$, engine speed (Ne), vehicle speed, (Veh), etc.) from various vehicle sensors. Although it is shown as a single controller, the VSC 18 may include multiple controllers that may be used to control multiple vehicle systems according to an overall vehicle control logic, or software. The vehicle controllers, including the VSC 18 generally include any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 18 communicates with other vehicle systems and controllers (e.g., the ECM 14, the TCM 34, etc.) over one or more wired or wireless vehicle connections using common bus protocols (e.g., CAN and LIN).

The VSC 18 communicates with the ECM 14 to control the shutdown and restart of the engine 16 based on input signals that correspond to brake apply and release conditions. The vehicle system 10 anticipates a vehicle launch event based on brake release conditions. By shutting down the engine 16, a micro-hybrid has improved fuel economy as compared to a conventional vehicle. However, the overall engine idle stop and automatic restart control process should not be perceptible to the driver. To provide transparent or imperceptible control performance relative to a conventional powertrain vehicle, the vehicle system 10 considers a number of brake apply and release conditions. First, vehicle motion when the vehicle 12 is stopped and subsequently launched should be comparable to that of a conventional powertrain vehicle under similar conditions. Generally, the brake system should have sufficient brake pressure ($P_{brk}$) either applied by the driver or through active brake controls to keep the vehicle 12 held at standstill condition. Equation 1 represents this concept and is derived from vehicle longitudinal dynamic parameters:

$$P_{brk} \geq P_{brk}^{epd} = \frac{\max(|T_{Creep} - T_g| + |T_d|, |-T_g| + |T_d|)}{K_{brk}} \quad (1)$$

where $P_{brk}^{epd}$ is a pressure threshold value at which the engine is shutdown or "pulled-down". $T_{Creep}$ is the total powertrain torque at the wheels in vehicle standstill condition; $T_g$ is the equivalent road gradient load torque on the wheels and $T_g$ is positive on uphill; $T_d$ is the torque on the wheels due to disturbance forces; and $K_{brk}$ is a nominal brake system design parameter or brake effectiveness coefficient. The brake pressure ($P_{brk}$) applied by the driver must be greater than $P_{brk}^{epd}$ in order to allow the engine to stop and to maintain the engine in the stopped state. The greater $P_{brk}$ is above $P_{brk}^{epd}$, the more stable the vehicle is with respect to uncertain $T_d$ values. Furthermore, the driver will release the brake effort during vehicle launch. As the brake torque is decreasing, there will no longer be sufficient isolating brake torque to prevent vehicle motion caused by the gravity load torque or the abrupt powertrain torque surges during engine restarts. To address such brake torque issues, the vehicle system includes hill start assist (HSA) or hill start brake assist (HSBA) functionality, to assure extended brake pressure is maintained at a sufficient level during brake release. The vehicle system coordinates the functionality of the brake apply and release detection (BARD) with the HSA or HSBA function to provide sufficient initial brake pressure level and to avoid actuation of a brake motor pump of the ABS control module 40. Such HSA or HSBA functions are known in the art, and not disclosed in detail herein. Although brake pressure ($P_{brk}$) is used to represent a driver's brake effort on the vehicle system. Other embodiments of the vehicle system 10 contemplate analyzing brake effort based on brake pedal travel or brake torque.

Additionally, to have transparent performance, the stop/start vehicle is expected to have comparable vehicle launch performance as a vehicle having a conventional powertrain. That is, the engine and the powertrain should resume a normal operating state before the vehicle propulsion will be expected from the driver with satisfactory torque delivery performance. Furthermore, the limited application time of a typical HSA function requires the powertrain to be brought back to normal as soon as possible for disturbance torque rejection like anti-roll back in uphill driving conditions.

The second goal generally specifies how quickly the engine can be restarted and how prompt the powertrain is ready to deliver the requested drive power when the driver intends to launch the vehicle. This second goal is represented by a preparation time delay ($t_{prep}$) between expected vehicle propulsion, and actual vehicle propulsion in an engine restart condition. Equation 2 provides an equation for calculating $t_{prep}$ and is represented below:

$$t_{prep} = t_{move} - t_{epu} \quad (2)$$

where $t_{move}$ is the instant of time (time instance) during a vehicle launch process when the powertrain propulsion torque is expected to cause vehicle motion; and $t_{epu}$ is the time instance during a vehicle launch process when the engine restart request is generated by detecting vehicle propulsion intention for the first time after the engine has been stopped.

The engine stop/start technology improves vehicle fuel economy by actively controlling engine on/off strategy to minimize unnecessary vehicle idling fuel consumption. An index ($\rho_{FEI}$) on its capability to improve fuel economy can be formulated as:

$$\rho_{FEI} = \frac{D_{epd}}{D_{stp}} * 100\% = \frac{\sum_j t_{epd}^j}{t_{move} - t_{stop}} * 100\% \quad (3)$$

where $t_{epd}$ is the time instance when the engine stop request is generated after the vehicle is stopped and $t_{stop}$ is the time instance when the vehicle is stopped, which is commonly determined when the vehicle speed is less than a small vehicle speed threshold for a certain period of settling down time. If the vehicle launch request is not generated accurately, there will be multiple engine on/off cycles during a single vehicle stop event. In this case, the total engine stop time consists of (j) occurrences of engine stop duration.

Equation 3 generally governs the fuel economy performance of the stop/start control system design. As the index denominator includes vehicle stop time ($t_{stop}$) and the vehicle move time ($t_{move}$) that are controlled by the driver, the fuel economy improvement is met by maximizing the numerator that is the length of the total engine stop duration $D_{epd}$. On one hand, $t_{epd}$ is expected to be as close to $t_{stop}$ as possible. After a vehicle is stopped, a driver will maintain a certain amount of brake effort to keep the vehicle held in standstill. Such a brake effort has a statistical distribution above the minimal pressure level. The higher the pressure, the less probable it will happen. While equation 3 requires applying high brake pressure to assure the vehicle standstill condition even after the engine is stopped, an unnecessarily high brake pressure threshold condition to generate an engine stop request will delay $t_{epd}$, and decrease overall fuel economy. Based on this analysis, the brake effort condition for an engine stop request is set to the lowest brake pressure threshold. Furthermore, j is expected to be as small as possible and the last $t_{epu}$ is expected to be as late before $t_{move}$ as possible. However, timing of the engine pull up request should balance fuel economy and promptness.

Figure 2:
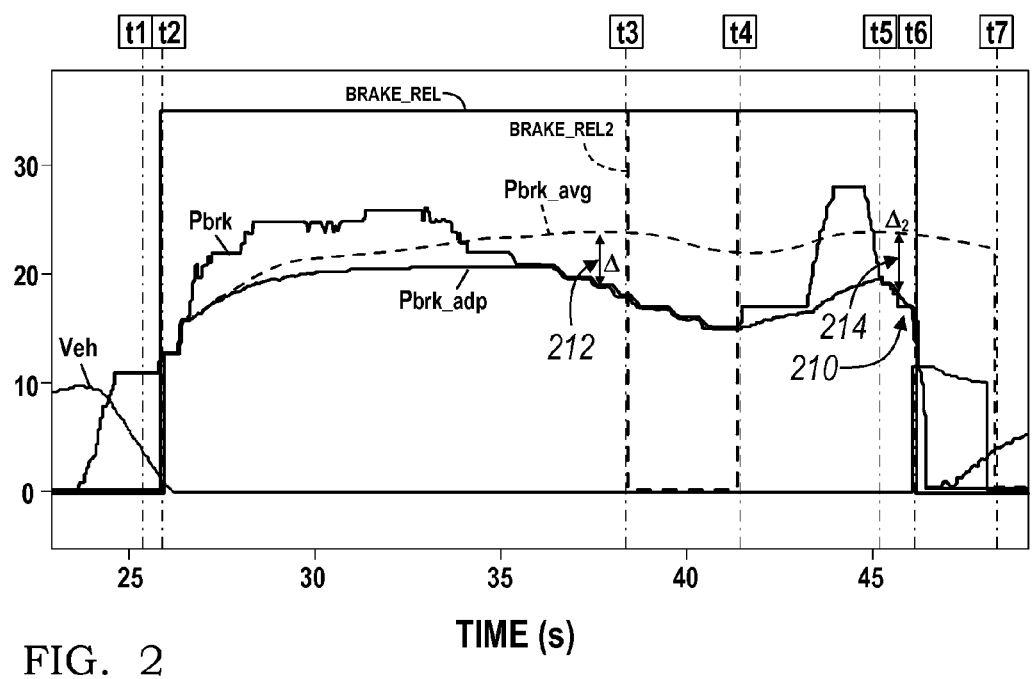
FIG. 2 is a time plot of brake system characteristics and vehicle speed, illustrating brake apply and release detection events.

FIG. 2 illustrates the impact of the vehicle system for controlling engine shutdown and restart based on brake apply and release conditions during a vehicle standstill condition. FIG. 2 illustrates a number of waveforms ($P_{brk}$, $P_{brk}^{adp}$, BRAKE_REL, Veh, $P_{brk\_avg}$, and BRAKE_REL2) that are plotted over time. $P_{brk}$ represents the brake pressure measured within the brake system. $P_{brk}^{adp}$ represents a filtered brake pressure that is calculated by the vehicle system. Veh represents vehicle speed. BRAKE_REL represents the brake release flag corresponding to $P_{brk}$ and $P_{brk}^{adp}$. For comparison, FIG. 2 also includes a reference curve ($P_{brk\_avg}$) using an existing moving average approach, as well as a brake release flag (BRAKE_REL2) corresponding to $P_{brk\_avg}$.

The waveforms illustrated in FIG. 2 are plotted over time. A number of brake apply and release events are indicated by vertical dashed lines and generally referenced by time instance variables ($t_1, t_2, t_3 \ldots t_7$). At time ($t_1$) the vehicle stops and at $t_2$ the engine is stopped, or "pulled down". At $t_6$ the engine is restarted or "pulled up" and at $t_7$ the vehicle begins to move.

A driver's braking behavior is embedded in the brake pressure signal ($P_{brk}$), and it generally exhibits both relatively steady state low frequency characteristics and high frequency characteristics. An intended brake releasing action is regarded as decisive and consistent brake reduction action in a certain manner. The brake releasing behavior is relatively high frequency dynamic motion in comparison to a steady state brake applying motion. However, due to a driver's personality, habits, and vehicle stop situations, the characteristics of a brake releasing motion may vary significantly from person to person. The vehicle system computes the filtered brake pressure ($P_{brk}^{adp}$) by dynamically filtering the driver's brake behavior reflected by $P_{brk}$ using a time constant selected based on which brake pressure region the brake pressure signal $P_{brk}$ is in. The control logic for calculating $P_{brk}^{adp}$ is described in detail with reference to FIG. 7. The vehicle system anticipates a vehicle launch by detecting a brake release pattern at point 210, which is based in part on a comparison of $P_{brk}$ to $P_{brk}^{adp}$. The control logic for detecting the brake release pattern is described in detail with reference to FIGS. 4 and 6. The brake release occurs at time $t_6$, as indicated by the brake release flag (BRAKE_REL) changing from positive (brake applied) to zero (brake released).

The $P_{brk\_avg}$ waveform illustrates data calculated using a prior art method for anticipating a vehicle launch request and is shown in dashed line for illustrative purposes in FIG. 2. Such a method includes calculating a moving average reference brake pressure value based on brake pressure and brake pressure change (increasing or decreasing). Such a method is susceptible to unintended brake releases and engine restarts because there is insufficient differentiation between driver's braking effort oscillation and the intended brake release. For example, a system using the prior art method may anticipate a brake release event and identify a vehicle launch condition at point 212, because $P_{brk}$ is decreasing and the difference (Δ)

between $P_{brk}$ and $P_{brk\_avg}$ is greater than a predetermined threshold value. Once the vehicle launch condition is identified, a brake release flag (BRAKE_REL2) changes from positive (brake applied) to zero (brake released) at time instance $t_3$, and the engine is restarted. However, this was an unintended brake release, as indicated by the increasing $P_{brk}$ at time instance $t_4$. Therefore, BRAKE_REL2 changes back to positive (brake applied) at time instance $t_4$, and the engine is shutdown. Such an unintended brake release may be the result of driver brake pedal oscillation, and the engine restart and subsequent shutdown decreases the overall fuel economy. The system anticipates another vehicle launch at point 214 and triggers another brake release at time $t_6$.

Equations 2 and 3 may be used to quantify the improvements of the method using the filtered brake pressure ($P_{brk}^{adp}$) over the prior art method using the moving average ($P_{brk\_avg}$). With reference to the prior art method, at time ($t_1$) the vehicle stops ($t_{stop}$=25.91 s), at $t_2$ the engine is stopped, or "pulled down" ($t_{epd}^1$=25.94 s). At $t_3$ an unintended brake release is detected and the first engine pull up occurs ($t_{epu}^1$=38.58 s). At $t_4$ the engine is pulled down for a second time ($t_{epd}^2$=41.42 s). At $t_5$ the engine is pulled up for a second time ($t_{epu}^2$=45.24 s). At $t_6$ the vehicle begins to move ($t_{move}$=46.94 s). The fuel economy improvement index for this example is calculated using Equation 3 to be 78.27%; and $t_{prep}$ is calculated using Equation 2 to be 1.70 s.

$$\rho_{FEI} = \frac{\sum_j t_{epu}^j - t_{epd}^j}{t_{move} - t_{stop}} * 100\%$$

$$= \frac{(38.58 - 25.94) + (45.24 - 41.42)}{46.94 - 25.91} * 100\%$$

$$= 78.27\%$$

$$t_{prep} = t_{move} - t_{epu}$$

$$= 46.94 - 45.24$$

$$= 1.70 \; s$$

The time delay ($t_{prep}$) is satisfactory, however the indexed fuel economy is low. It is clear that the engine restart at 38.58 s is not desirable.

Applying the filtered brake pressure computation strategy to the same vehicle stop example shown in FIG. 2. The following results are obtained: it can be observed from FIG. 2 that j=1 and $t_{epu}$=46.11 s at $t_6$. The fuel economy improvement index for this example is calculated as:

$$\rho_{FEI} = \frac{D_{epd}}{D_{stp}} * 100\%$$

$$= \frac{\sum_j t_{epu}^j - t_{epd}^j}{t_{move} - t_{stop}} * 100\%$$

$$= 95.93\%$$

Assuming constant fuel consumption rate at vehicle idling state, the difference in the index ($\rho_{FEI}$) between the prior art method and the disclosed method is equivalent to a 22.5% less fuel consumption in this specific exemplary vehicle stop event. Additionally, $t_{prep}=t_{move}-t_{epu}=0.825$ s still satisfies a prompt engine restart goal. As such the vehicle system provides improvements over prior art systems by limiting vehicle motion during the whole engine stop/start process and providing prompt powertrain readiness during vehicle launch with maximized fuel economy benefit.

Figure 3:
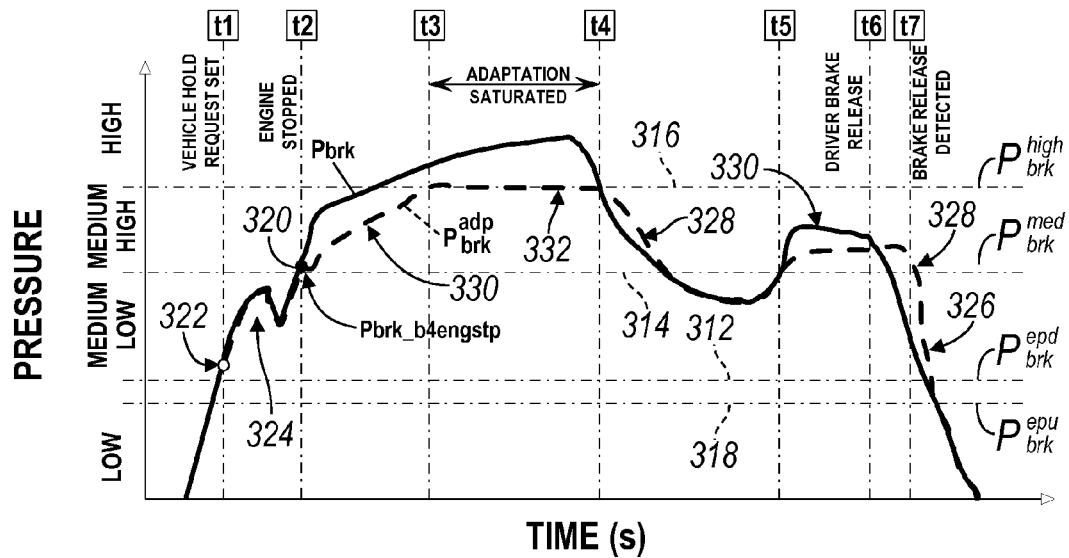
FIG. 3 is another time plot of brake system characteristics, illustrating brake apply and release detection events controlled by the vehicle system of FIG. 1.

FIG. 3 is a graph illustrating waveforms ($P_{brk}$ and $P_{brk}^{adp}$) of brake system characteristics during a vehicle standstill event. The $P_{brk}$ waveform represents actual brake pressure measured within the brake system (e.g., within the brake lines or master cylinder). The $P_{brk}^{adp}$ waveform is a brake pressure reference curve comprising data that is calculated using a dynamic filtering adaptation strategy, and is generally referred to as filtered brake pressure. This strategy is described in detail with respect to FIG. 7. The VSC 18 controls the start/stop functionality of the engine 16 based on a number of conditions including a comparison of $P_{brk}$ data to corresponding $P_{brk}^{adp}$ data.

To differentiate brake releasing detection sensitivity with respect to pressure levels, the brake pressure operating range is partitioned into several regions that are defined by dynamic boundaries that are dependent upon a number of vehicle conditions. These dynamic boundaries ($P_{brk}^{epd}$, $P_{brk}^{medium}$, and $P_{brk}^{high}$) are each represented by horizontal dashed lines in FIG. 3. These boundaries separate the brake pressure operating range into Low, Medium-Low, Medium-High, and High brake pressure regions. $P_{brk}^{epd}$ is a brake pressure threshold value at which the engine is shutdown or "pulled-down", and is referenced by line 312 in FIG. 3. $P_{brk}^{epd}$ is calculated using equation 1 and represents the minimal brake pressure level for holding a vehicle at standstill after the engine is stopped. As illustrated in FIG. 3, $P_{brk}^{epd}$ defines a dynamic boundary that separates the Low and Medium-Low brake pressure regions. $P_{brk}^{medium}$ is an intermediate brake threshold value that defines a dynamic boundary that separates the Medium-Low and the Medium-High brake pressure regions, and is referenced by line 314 in FIG. 3. $P_{brk}^{high}$ is a high brake pressure threshold value that defines a dynamic boundary that separates the Medium-High and the High brake pressure regions, and is referenced by line 316 in FIG. 3. Additionally, $P_{brk}^{epu}$ is a brake pressure threshold value at which the engine is started or "pulled-up", and is referenced by line 318 in FIG. 3. $P_{brk}^{epu}$ represents the minimal brake pressure level below which the engine has to be restarted to prepare for propulsion torque delivery immediately. $P_{brk}^{epd}$ and $P_{brk}^{epu}$ are offset from each other to further avoid unintended brake releases, and to provide a hysteresis region.

The vehicle system calculates $P_{brk}^{medium}$ according to equation 4 as shown below:

$$P_{brk}^{medium} = \begin{cases} P_{brk}^{b4engstp} & \text{if } P_{brk}^{rgl} \geq P_{brk}^{Creep} \\ \min(P_{brk}^{b4engstp}, P_{brk}^{epd} + \varphi_{brk}^{upb1}) & \text{else} \end{cases} \quad (4)$$

where $P_{brk}^{b4engstp}$ is the measured brake pressure ($P_{brk}$) value at the moment when the engine 16 is stopped, and is referenced by numeral 320 in FIG. 3. The vehicle system stores this historic value ($P_{brk}^{b4engstp}$) within the memory of the VSC 18 or ECM 14. $P_{brk}^{b4engstp}$ represents the brake pressure level at which the driver is confidently holding the vehicle at standstill irrespective of engine stop/restart events. Thus, this brake pressure value ($P_{brk}^{b4engstp}$) takes into account any road gradient. $P_{brk}^{rgl}$ is the equivalent brake pressure that counteracts road gradient load torque, and $P_{brk}^{Creep}$ is the equivalent brake pressure that counteracts powertrain idling torque output at nominal brake condition. $P_{brk}^{rgl}$ is greater when the vehicle is stopped on an incline (e.g., on a hill). Therefore the first condition (if $P_{brk}^{rgl} \geq P_{brk}^{Creep}$) of equation 4 is generally satisfied when the vehicle is stopped on an incline. $\varphi_{brk}^{upb1}$ s a design parameter that offsets $P_{brk}^{epd}$ upwards to determine a medium pressure level boundary.

The vehicle system calculates $P_{brk}^{high}$ according to equation 5 as shown below:

$$P_{brk}^{high} = P_{brk}^{b4engstp} + \phi_{brk}^{upb2} \qquad (5)$$

where $\phi_{brk}^{upb2}$ is a second design parameter used to determine the lower boundary of the High brake pressure region. As a result, the final partitioned brake pressure region is illustrated in FIG. 3, with brake pressure regions: Low, Med-Low, Med-High, and High separated by boundary lines: 312 ($P_{brk}^{epd}$), 314 ($P_{brk}^{med}$), and 316 ($P_{brk}^{high}$), respectively.

Figure 4:
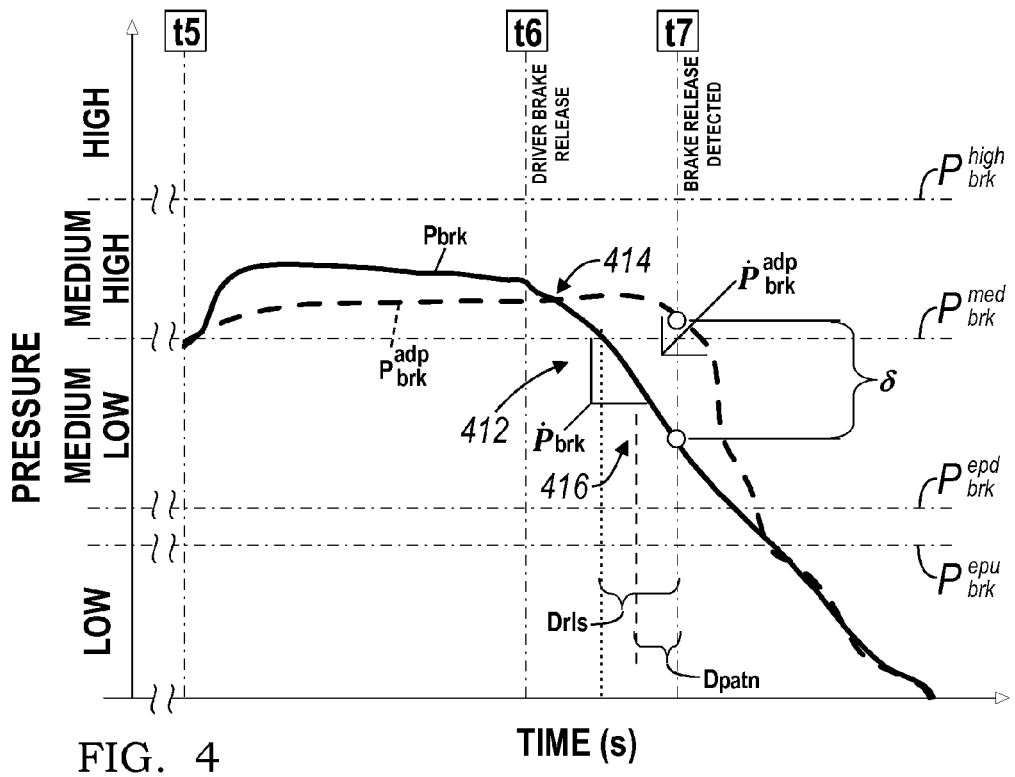
FIG. 4 is an enlarged view of a portion of FIG. 3, illustrating a brake release pattern.

The waveforms illustrated in FIG. 3 are plotted over a common period of time. A number of brake apply and release events are indicated by vertical dashed lines and generally referenced by time instance variables ($t_1, t_2, t_3 \ldots t_7$). At time ($t_1$) a vehicle hold request is set and the corresponding brake pressure ($P_{brk}$) is referenced by numeral 322. At time ($t_2$) the engine 16 is stopped, or "pulled down" at 320. Between times ($t_3$) and ($t_4$) the $P_{brk}^{adp}$ waveform is saturated by limiting $P_{brk}^{adp}$ to $P_{brk}^{high}$. Time instances $t_5$-$t_7$ relate to brake release and vehicle launch. FIG. 4 depicts an enlarged view of the brake release portion ($t_5$-$t_7$) of the waveforms illustrated in FIG. 3.

With reference to FIG. 3, the vehicle system evaluates a vehicle hold request at time ($t_1$). The vehicle hold request determination of the brake apply and release detection function determines the state when the driver is not requesting vehicle propulsion. The vehicle hold request determines that sufficient brake pressure has been applied by the driver such that there will be adequate isolation resistive friction torque capacity acting on the wheel to limit vehicle motion caused by road gradient load torque ($T_g$) and other disturbance torques ($T_d$) after the engine is stopped and when the engine is restarted automatically. Furthermore, it also determines that the HSA function will have enough initial brake pressure to function when the driver will release the brake for vehicle launch. Brake state conditions are constructed for setting the vehicle hold request. Such conditions are defined and calibrated to achieve an optimal balancing between vehicle stability and fuel economy, i.e., the lowest sufficient brake pressure threshold for vehicle hold request detection.

Figure 5:
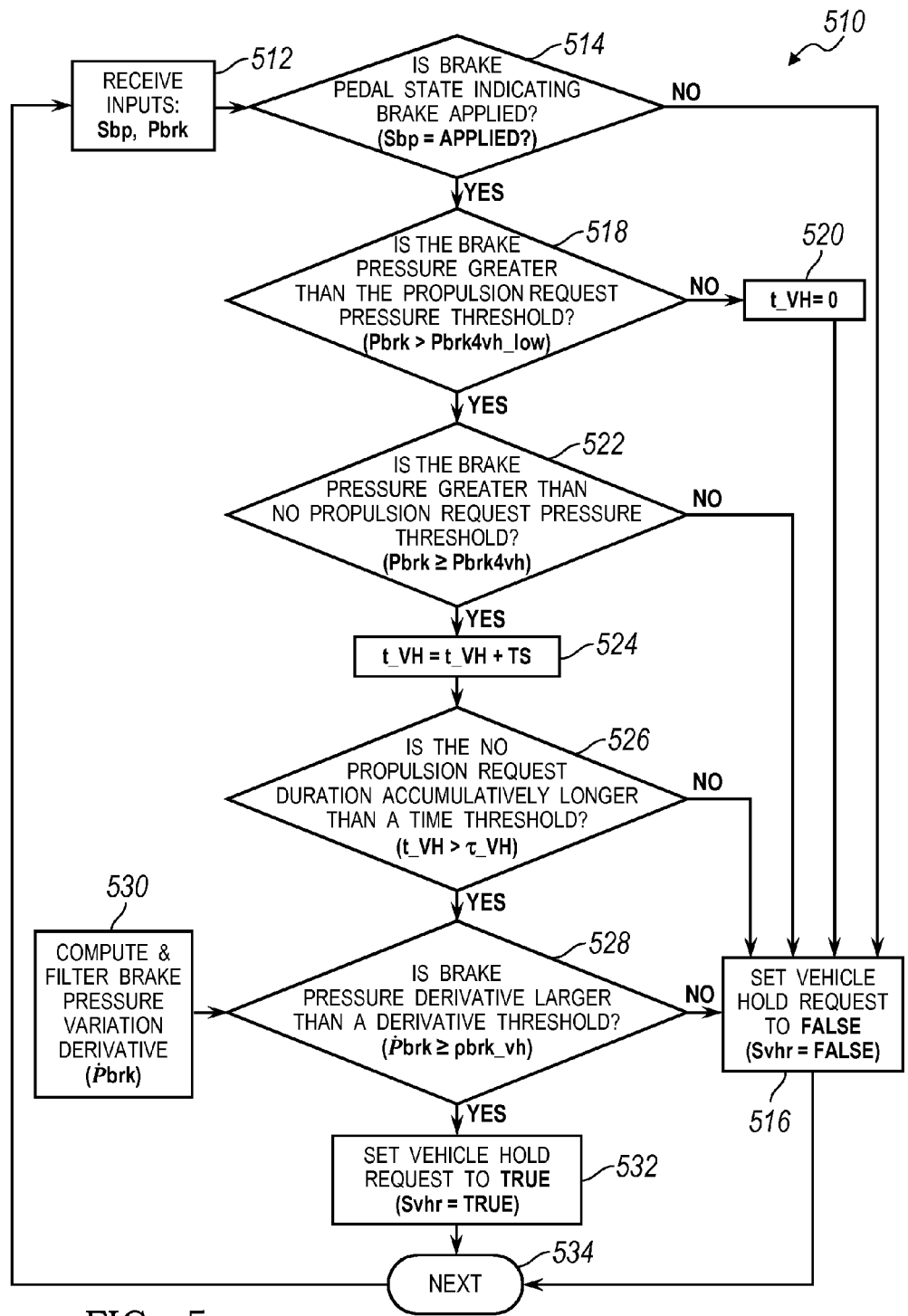
FIG. 5 is a flow chart illustrating a method for evaluating a vehicle hold request based on brake apply characteristics according to one or more embodiments.

Referring to FIG. 5, a method for evaluating a vehicle hold request based on brake apply conditions is illustrated according to one or more embodiments and generally referenced by numeral 510. The brake apply state conditions include:

1. $S_{bp}$=TRUE;
2. $P_{brk} \geq P_{brk4vh}$;
3. $t_{VH} > \tau_{VH}$; and
4. $\dot{P}_{brk} \geq \rho_{brk\_vh}$.

where $S_{bp}$ is the brake pedal state; $P_{brk}$ is the actual brake pressure; $t_{VH}$ is a vehicle hold timer; and $\dot{P}_{brk}$ is the brake pressure derivative or rate of change. The method 510 is implemented using software code contained within the VSC 18 according to one or more embodiments. In other embodiments the software code is shared between multiple controllers (e.g., the VSC 18 and the ECM 14).

In operation 512 the vehicle system receives input signals ($S_{bp}$ and $P_{brk}$). At operation 514 the brake pedal state signal ($S_{bp}$) is analyzed to determine if the brake pedal is applied. $S_{bp}$ is measured by the brake pedal switch shown in FIG. 1, according to one embodiment. If the determination at operation 514 is negative, which indicates that the brake pedal is released, then the vehicle system proceeds to operation 516 and sets the vehicle hold request ($S_{vhr}$) to FALSE. If the determination at operation 514 is positive ($S_{bp}$=TRUE), then the vehicle system determines that the first brake apply state condition is satisfied and proceeds to operation 518.

Brake pressure ($P_{brk}$) is compared to a propulsion request pressure threshold ($P_{brk4vh\_low}$) at operation 518. $P_{brk4vh\_low}$ represents the minimal brake pressure level below which the engine has to be restarted to prepare for propulsion torque delivery immediately. $P_{brk4vh\_low}$ is generally referenced by the $P_{brk}^{epu}$ horizontal line in FIG. 3. The vehicle system calculates $P_{brk4vh\_low}$ according to equation 6 as shown below:

$$P_{brk4vh\_low} = \begin{cases} \max(P_{brk}^{Creep}, P_{brk}^{rgl}) + P_{sm2} & \text{if } \alpha^{est} \geq 0 \\ P_{brk}^{Creep} + P_{brk}^{rgl} + P_{sm2} & \text{else} \end{cases} \qquad (6)$$

where $P_{brk}^{Creep}$ is the equivalent brake pressure that counteracts powertrain idling torque output at nominal brake condition, and $P_{brk}^{rgl}$ is the equivalent brake pressure that counteracts road gradient load torque. $\alpha^{est}$ is a real-time estimated road gradient at the vehicle stop location. This gradient may be measured by the gradient sensor 52 shown in FIG. 1, or estimated based in part on the gradient signal (GS). $P_{sm2}$ is a calibrated value. At operation 518, brake pressure ($P_{brk}$) comp is compared to a propulsion request pressure threshold ($P_{brk4vh\_low}$) to determine if $P_{brk}$ is greater then $P_{brk4vh\_low}$. If the determination at operation 518 is negative, then the vehicle system proceeds to operation 520 and resets a vehicle hold time counter ($t_{VH}$), by setting $t_{VH}$ equal to zero seconds. After operation 520, the vehicle system proceeds to operation 516 and sets the vehicle hold request ($S_{vhr}$) to FALSE. If the determination at operation 518 is positive ($P_{brk} > P_{brk4vh\_low}$), then the vehicle system proceeds to operation 522.

At operation 522, brake pressure ($P_{brk}$) is compared to a no propulsion request pressure threshold ($P_{brk4vh}$). $P_{brk4vh}$ represents the minimal brake pressure level for robust vehicle hold at standstill even after the engine will be stopped. $P_{brk4vh}$ is generally referenced by the $P_{brk}^{epd}$ horizontal line in FIG. 3. The vehicle system calculates $P_{brk4vh}$ according to equation 7 as shown below:

$$P_{brk4vh} = \begin{cases} \max(P_{brk}^{Creep}, P_{brk}^{rgl}) + P_{sm1} & \text{if } \alpha^{est} \geq 0 \\ P_{brk}^{Creep} + P_{brk}^{rgl} + P_{sm1} & \text{else} \end{cases} \qquad (7)$$

The variables of equation 7 are similar to those described above for equation 8. $P_{sm1}$ is a calibrated value, and $P_{sm1} > P_{sm2} > 0$.

At operation 522, brake pressure ($P_{brk}$) is compared to the minimal propulsion request pressure threshold ($P_{brk4vh}$), to determine if $P_{brk}$ is greater than or equal to $P_{brk4vh}$. If the determination at operation 522 is negative, then the vehicle system proceeds to operation 516 and sets the vehicle hold request ($S_{vhr}$) to FALSE. If the determination at operation 522 is positive ($P_{brk} \geq P_{brk4vh}$), then the vehicle system determines that the second brake apply state condition is satisfied and proceeds to operation 524. At operation 524 the vehicle system sets the vehicle hold time counter ($t_{VH}$) equal to the sum of the vehicle hold timer and the implementation cycle time ($T_s$), or task rate ($t_{VH} = t_{VH} + Ts$).

At operation 526 the vehicle system compares the vehicle hold time counter value ($t_{VH}$), to a predetermined time threshold ($\tau_{VH}$. For example, $\tau_{VH}$ is equal to one second in one embodiment. $t_{VH}$ represents the accumulated time in which there has been no propulsion request. The phrase "propulsion request" as used herein refers to both brake apply conditions and the accelerator pedal position, according to one or more embodiments. In one embodiment, a "no propulsion request" corresponds to when all four of the brake apply conditions are satisfied and the APP signal indicates that the accelerator pedal is not applied. If the determination at operation 526 is negative, then the vehicle system proceeds to operation 516 and sets the vehicle hold request ($S_{vhr}$) to FALSE. If the determination at operation 526 is positive ($t_{VH} > \tau_{VH}$), then the vehicle system determines that the third brake apply state condition is satisfied and proceeds to operation 528.

At operation 528 the vehicle system evaluates the derivative or rate of change of ($P_{brk}$). At operation 530 the vehicle system calculates $\dot{P}_{brk}$, which is the numerical derivative of $P_{brk}$ with respect to the task rate ($T_s$). At operation 528 the vehicle system determines if $\dot{P}_{brk}$ is greater than or equal to a derivative threshold ($\rho_{brk\_vh}$). If the determination at operation 528 is negative, then the vehicle system proceeds to operation 516 and sets the vehicle hold request ($S_{vhr}$) to FALSE. However, if the determination at operation 528 is positive, ($\dot{P}_{brk} \geq \rho_{brk\_vh}$), then the vehicle system determines that the fourth brake apply state condition is satisfied and proceeds to operation 532 and sets the vehicle hold request ($S_{vhr}$) to TRUE. $\rho_{brk\_vh}$ is a positive brake pressure threshold rate, therefore a positive determination at operation 528 indicates that the rate of change (slope) of $P_{brk}$ is increasing. The time instance where $S_{vhr}$=TRUE is represented by vertical line $t_1$, and referenced by numeral 322 in FIG. 3. After operations 532 or 516 the vehicle system proceeds to operation 534, and then returns to operation 514.

After the vehicle hold request is set to TRUE, as described with respect to the method 510, the vehicle system stops or "pulls-down" the engine. In one or more embodiments, the VSC provides the vehicle hold request to the ECM, which in turn stops the engine. With reference to FIG. 3, the vehicle hold request is set at $t_1$, and the engine is stopped at $t_2$.

With reference to FIGS. 3 and 4, the vehicle system evaluates a vehicle launch request between time ($t_5$-$t_7$). To provide comparable vehicle launch performance without sacrificing the fuel economy benefit, the vehicle system anticipates the time at which vehicle propulsion will be requested by the driver such that the engine and the powertrain can be brought back to a normal state to prepare for upcoming vehicle launch. A normal state for the engine and powertrain means their normally running state without experiencing an automatic stop event. Such a vehicle launch intention from the driver is interpreted promptly to avoid delaying powertrain torque readiness. The vehicle system must also determine the launch intention accurately to avoid an unintended engine restart, which reduces fuel economy as described above with reference to FIG. 2.

Figure 6:
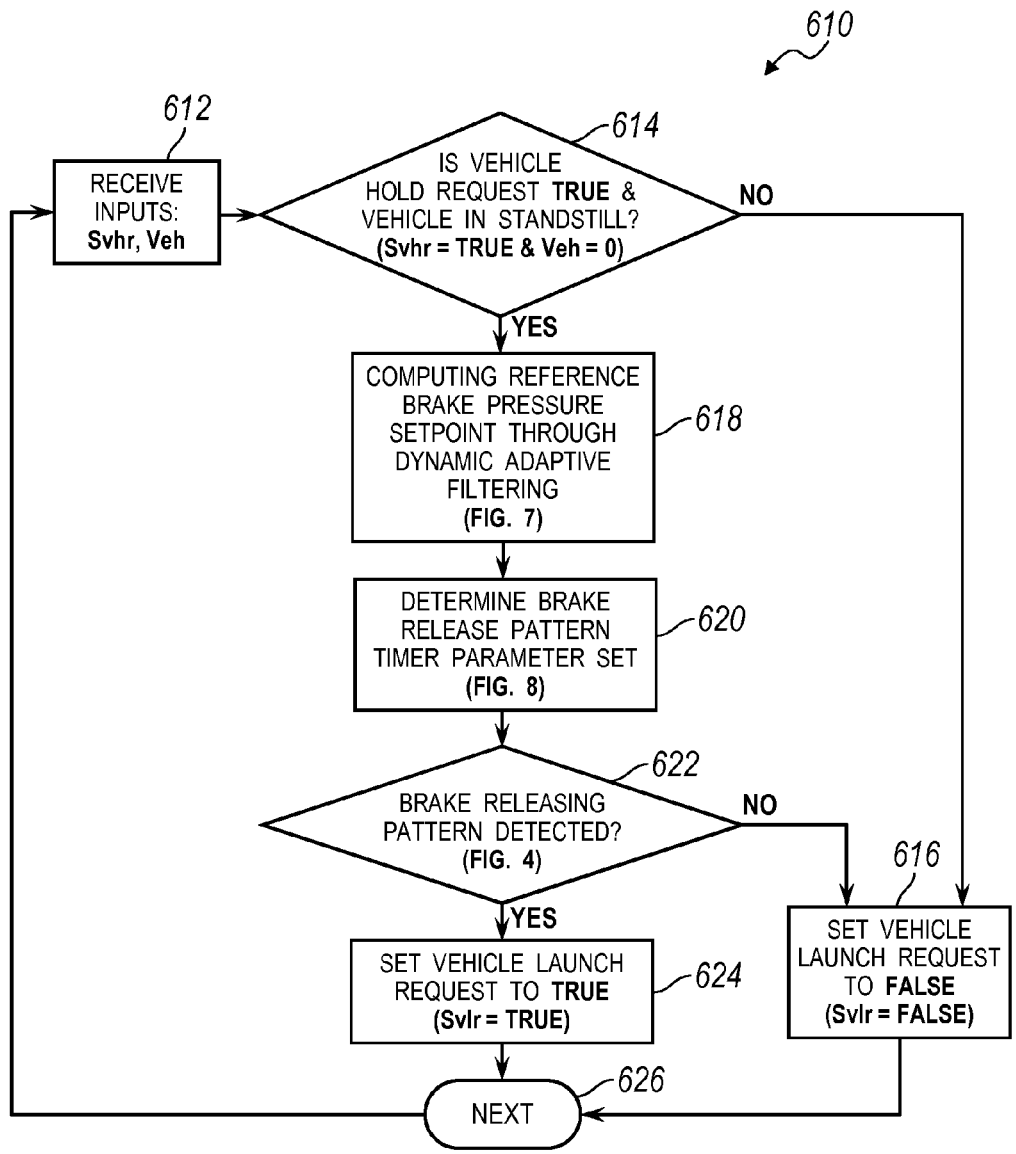
FIG. 6 is a flow chart illustrating a method for evaluating a vehicle launch request based on brake release characteristics according to one or more embodiments.

Referring to FIG. 6, a method for evaluating a vehicle launch request based on brake state conditions is illustrated according to one or more embodiments and generally referenced by numeral 610. The method 610 is implemented using software code contained within the VSC 18 according to one or more embodiments. In other embodiments the software code is shared between multiple controllers (e.g., the VSC 18 and the ECM 14).

In operation 612 the vehicle system receives input signals ($S_{vhr}$ and $V_{eh}$). At operation 614 the vehicle system evaluates the vehicle hold request ($S_{vhr}$) and vehicle speed ($V_{eh}$) to determine if both $S_{vhr}$ is TRUE, and $V_{eh}$ corresponds to zero miles per hour. If the determination at operation 614 is negative, the vehicle system proceeds to operation 616 and sets the vehicle launch request ($S_{vlr}$) to FALSE. If the determination at operation 614 is positive, then the vehicle system proceeds to block 618.

At block 618, the vehicle system computes the filtered brake pressure ($P_{brk}^{adp}$) by adp dynamically filtering the driver's brake behavior reflected by $P_{brk}$. $P_{brk}^{adp}$ serves as a reference brake state from which a potential brake release can be detected when $P_{brk}$ deviates from $P_{brk}^{adp}$. The vehicle launch request detection algorithm aims to achieve an optimal tradeoff between identification sensitivity and accuracy. To this end, an adaptive pattern based vehicle launch intention detection algorithm is designed for the stop/start vehicle application. It determines the state and time that the driver is requesting or is about to request vehicle propulsion in order to promptly trigger engine automatic startup and prepare for vehicle launch.

Figure 7:
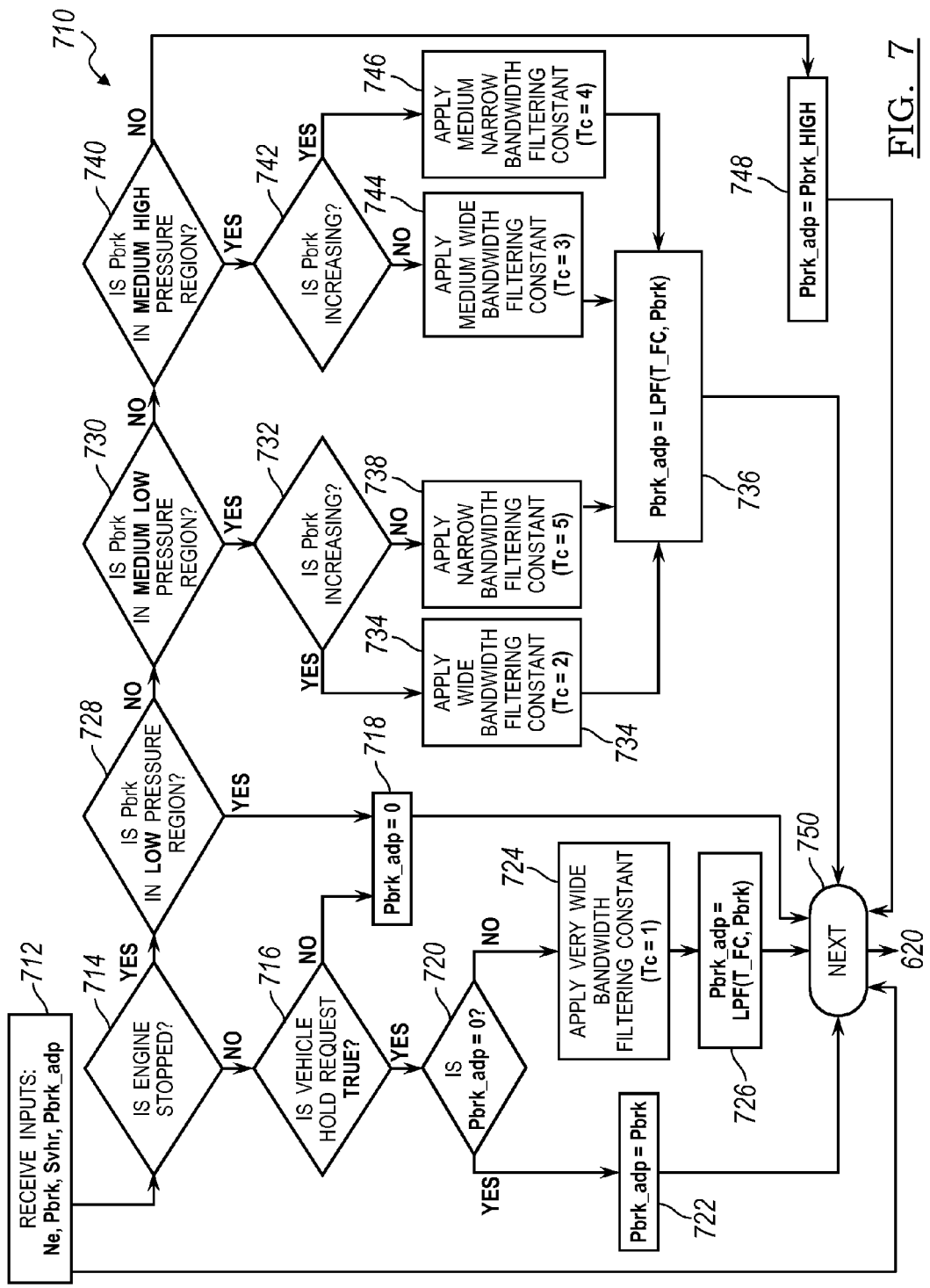
FIG. 7 is a flow chart illustrating a method for evaluating a filtered adaptation of brake pressure associated with a vehicle launch request based on brake release characteristics according to one or more embodiments.

FIG. 7 illustrates a method for determining the filtered brake pressure ($P_{brk}^{adp}$) through dynamic filtering and is generally referenced by numeral 710. The control logic of method 710 is included within block 618 of method 610, according to one or more embodiments. The method 710 controls the sensitivity of the brake releasing detection using a dynamic low pass filter with condition based variable filtering bandwidth, where a wide bandwidth results in low sensitivity, and a narrow bandwidth results in high sensitivity.

The filtered brake pressure ($P_{brk}^{adp}$) is adaptively computed through the dynamic filter according to the following equation:

$$P_{brk}^{adp} = LPF(P_{brk})|T_{FC} \qquad (8)$$

where $P_{brk}^{adp}$ is a low pass filtered value with respect to variable filtering time constant $T_{FC}$. Following the pressure region partition example shown in FIG. 3, five different values are predefined for $T_{FC}$ with varying bandwidth, including: very wide bandwidth $T_{FC}^1$), wide bandwidth ($T_{FC}^2$), medium wide bandwidth ($T_{FC}^3$), medium narrow ($T_{FC}^4$) and narrow bandwidth ($T_{FC}^5$) of filtering frequency domain properties. The wider the bandwidth, the closer the filtered signal is to the raw $P_{brk}$ data and the harder it is to separate a brake releasing pattern from the brake action (low sensitivity). On the other hand, the narrower the bandwidth, the more steady state the filtered $P_{brk}^{adp}$ and the easier a pressure reduction can be identified as brake releasing when deviating from $P_{brk}^{adp}$ (high sensitivity). In one or more embodiments the time constants are distributed along a range between 0.05 and 3.5 s, and the corresponding bandwidths are distributed along a frequency range between 2.5 Hz and 0.04 Hz; where the very wide bandwidth corresponds to the high end of the frequency range and the low end of the time constant range, and conversely the narrow bandwidth corresponds to the low end of the frequency range and the high end of the time constant range. In other embodiments, the very wide bandwidth ($T_{FC}^1$) corresponds to a time constant of approximately 0.08 s, and a bandwidth of approximately 2 Hz; the wide bandwidth ($T_{FC}^2$) corresponds to a time constant of approximately 0.15 s, and a bandwidth of approximately 1 Hz; the medium wide bandwidth ($T_{FC}^3$), corresponds to a time constant of approximately 0.30 s, and a bandwidth of approximately 0.5 Hz; the medium narrow ($T_{FC}^4$) corresponds to a time constant of approximately 1.5 s, and a bandwidth of approximately 0.1 Hz; and the narrow bandwidth ($T_{FC}^5$) corresponds to a time constant of approximately 3.0 s, and a bandwidth of approximately 0.05 Hz.

At operation 712 the vehicle system receives inputs (Ne, $S_{vhr}$, $P_{brk}^{adp}$ and $P_{brk}$). At operation 714, the vehicle system determines if the engine is stopped. In one embodiment, this determination is based on the engine speed signal (Ne) shown in FIG. 1. If the determination at operation 714 is negative (the engine is not stopped), then the vehicle system proceeds to operation 716.

At operation 716, the vehicle system evaluates the vehicle hold request ($S_{vhr}$) that was determined by method 510, to determine if $S_{vhr}$ is set to TRUE. If the determination at operation 716 is negative, then the vehicle system proceeds to operation 718 and sets the filtered brake pressure ($P_{brk}^{adp}$) to zero. If the determination at operation 716 is positive, then the vehicle system proceeds to operation 720.

At operation 720, the vehicle system evaluates the present $P_{brk}^{adp}$ value to determine if it is equal to zero. If the determination at operation 720 is positive, the vehicle system proceeds to operation 722 and sets $P_{brk}^{adp}$ equal to the present brake pressure ($P_{brk}$) value to initialize the filtered brake pressure. If the determination at operation 720 is negative, then the vehicle system proceeds to operation 724 and selects a very wide bandwidth filtering constant ($T_{FC}^1$). The vehicle system then proceeds to operation 726 and calculates $P_{brk}^{adp}$ using equation 8 with a very wide bandwidth time constant ($T_{FC}^1$).

If the determination at operation 714 is positive, then the vehicle system proceeds to operation 728 to determine if $P_{brk}$ is in the low brake pressure region. With reference to FIG. 3 prior to time $t_1$, the low pressure region is defined by brake pressure values that are less than line 312 ($P_{brk}^{epd}$), according to one or more embodiments. If the determination at operation 728 is positive, then the vehicle system proceeds to operation 718 and sets $P_{brk}^{adp}$ equal to zero. If the determination at operation 728 is negative, then the vehicle system proceeds to operation 730.

At operation 730, the vehicle system determines if $P_{brk}$ is in the medium-low brake pressure region. With reference to FIG. 3, the medium-low pressure region is defined by brake pressure values between lines 312 ($P_{brk}^{epd}$) and 314 ($P_{brk}^{med}$), according to one or more embodiments. If the determination at operation 730 is positive, then the vehicle system proceeds to operation 732 to determine if $P_{brk}$ is increasing. If the determination at operation 732 is positive, the vehicle system proceeds to operation 734 and selects a wide bandwidth filtering constant ($T_{FC}^2$). The vehicle system then proceeds to operation 736 and calculates $P_{brk}^{adp}$ using equation 8 with $T_{FC}^2$. The wider the filtering bandwidth, the more original content is reflected by the reference signal ($P_{brk}^{adp}$), and thus the less the sensitivity. Such conditions are referenced by numeral 324 in FIG. 3, where there is little sensitivity or variation between $P_{brk}$ and $P_{brk}^{adp}$. If the determination at operation 732 is negative, then the vehicle system proceeds to operation 738.

At operation 738 the vehicle system selects a narrow bandwidth filtering constant ($T_{FC}^5$). The vehicle system then proceeds to operation 736 and calculates $P_{brk}^{adp}$ using equation 8 with $T_{FC}^5$. The more narrow the filtering bandwidth, the more steady state the reference signal ($P_{brk}^{adp}$), and the more sensitive a deviation can be detected when moving away from the filtered brake pressure. Such conditions are referenced by numeral 326 in FIG. 3, where there is much sensitivity or variation between $P_{brk}$ and $P_{brk}^{adp}$. If the determination at operation 730 is negative, then the vehicle system proceeds to operation 740.

At operation 740 the vehicle system determines if $P_{brk}$ is in the medium-high pressure region. With reference to FIG. 3, the medium-high pressure region is defined by brake pressure values between line 314 ($P_{brk}^{med}$) and line 316 ($P_{brk}^{high}$), according to one or more embodiments. If the determination at operation 740 is positive, the vehicle system proceeds to operation 742 to determine if $P_{brk}$ is increasing. If the determination at operation 742 is negative, then the vehicle system proceeds to operation 744.

At operation 744, the vehicle system selects a medium wide bandwidth filtering constant ($T_{FC}^3$). The vehicle system then proceeds to operation 736 and calculates $P_{brk}^{adp}$ using equation 8 with $T_{FC}^3$. Again, the wider the filtering bandwidth, the more original content is reflected by the reference signal ($P_{brk}^{adp}$) and thus the less the sensitivity. Such conditions are referenced by numeral 328 in FIG. 3, where is moderate sensitivity or variation between $P_{brk}$ and $P_{brk}^{adp}$. If the determination at operation 742 is positive, then the vehicle system proceeds to operation 746.

At operation 746, the vehicle system selects a medium narrow bandwidth filtering constant ($T_{FC}^4$). The vehicle system then proceeds to operation 736 and calculates $P_{brk}^{adp}$ using equation 8 with $T_{FC}^4$. Again, the more narrow the filtering bandwidth, the more steady state the reference signal ($P_{brk}^{adp}$), and the more sensitive a deviation can be detected when moving away from that filtered brake pressure. Such conditions are referenced by numeral 330 in FIG. 3, where there is moderate sensitivity or variation between $P_{brk}$ and $P_{brk}^{adp}$.

If the determination at operation 740 is negative then the vehicle system determines that $P_{brk}$ is in the high pressure region. With reference to FIG. 3, the high pressure region is defined by brake pressure values that are greater than $P_{brk}^{high}$, according to one or more embodiments. The vehicle system then proceeds to operation 748 and sets $P_{brk}^{adp}$ equal to $P_{brk}^{high}$. The filtered brake pressure $P_{brk}^{adp}$ is saturated, or set equal to a maximum value $P_{brk}^{high}$ in the high pressure region, to stop detection because it is not necessary to trigger a vehicle launch request at such a high brake pressure level. Such conditions are referenced by numeral 332 in FIG. 3. After operations 722, 726, 736, and 748 the vehicle system proceeds to operation 750.

At operation 750 the vehicle system returns to operation 714. Additionally, at operation 750 the vehicle system provides output values determined by the method 710 to block 620 of the method 610 shown in FIG. 6. At block 620, the vehicle system determines the release pattern timer strategy.

Figure 8:
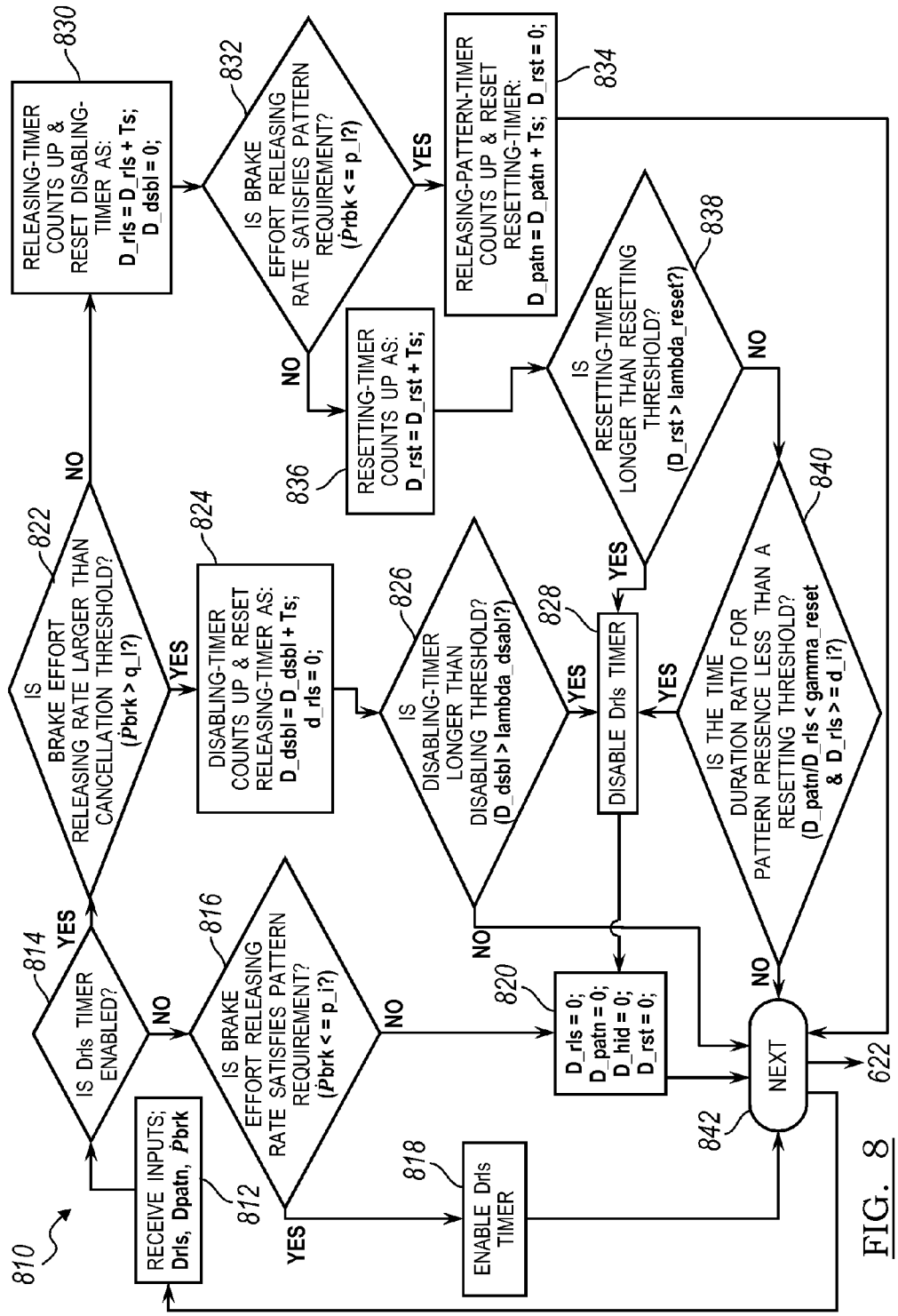
FIG. 8 is a flow chart illustrating a method for evaluating a pattern timing associated with a vehicle launch request based on brake release characteristics according to one or more embodiments.

FIG. 8 illustrates a method for determining a brake release pattern timer strategy and is generally referenced by numeral 810. The control logic of method 810 is included within block 620 of method 610, according to one or more embodiments. The vehicle system receives input signals ($D_{rls}$, $\dot{P}_{brk}$, $D_{patm}$) at operation 812. In order to capture both the presence and the persistence of the brake releasing conditions, two primary brake release pattern timers are defined as $D_{rls}$ and $D_{patm}$. $D_{rls}$ represents a total time duration since the initial qualified brake release started and $D_{patm}$ represents a summation of time durations of qualified brake releases. $\dot{P}_{brk}$ represents a brake effort releasing rate of change, which is the derivative of the actual brake pressure ($P_{brk}$).

At operation 814, the vehicle system determines if the $D_{rls}$ timer has been enabled. The $D_{rls}$ timer is enabled when the timer is counting. If the determination at operation 814 is negative (e.g., $D_{rls}$=zero), then the vehicle system proceeds to operation 816 to evaluate the brake effort releasing rate ($\dot{P}_{brk}$). At operation 816 the vehicle system determines if $\dot{P}_{brk}$ is less than or equal to a brake pressure threshold value ($p_i$). $p_i$ is a negative brake pressure threshold rate, therefore a positive determination at operation 816 ($\dot{P}_{brk} \leq p_i$) indicates that that the rate of change (slope) of $P_{brk}$ is decreasing. Such conditions are referenced by numeral 412 in FIG. 4. If the determination at operation 816 is positive, then the vehicle system proceeds to operation 818 and enables the $D_{rls}$ timer. If the determination at operation 818 is negative, the vehicle system determines that the rate of change of $P_{brk}$ is not decreasing (e.g., increasing or level), and proceeds to operation 820. At operation 820 the vehicle system sets variables $D_{rls}$, $D_{patn}$, $D_{hld}$, and $D_{rst}$ equal to zero. $D_{hld}$ represents a hold timer and $D_{rst}$ represents a resetting timer. If the determination at operation 814 is positive, then the vehicle system proceeds to operation 822.

At operation 822 the vehicle system compares the brake effort releasing rate ($\dot{P}_{brk}$) to a brake pressure cancellation threshold value ($q_i$). $q_i$ is a negative brake pressure threshold rate, therefore a positive determination at operation 822 ($\dot{P}_{brk} > q_i$) indicates that that the rate of change (slope) of $P_{brk}$ is increasing or decreasing at a rate that is greater than $q_i$. If the determination at operation 822 is positive, then the vehicle system proceeds to operation 824. At operation 824 the vehicle system increments the disabling timer ($D_{dsbl}$) by one implementation cycle ($T_s$), and resets the releasing timer ($D_{rls}$) by setting ($D_{dsbl} = D_{dsbl} + T_s$ and $D_{rls} = 0$). At operation 826, the vehicle system determines if the disabling timer ($D_{dsbl}$) is greater than a disabling threshold value ($\lambda_{dsbl}$). If the determination at operation 826 is positive, then the vehicle system proceeds to operation 828 and disables the $D_{rls}$ timer. If the determination at operation 822 is negative, the vehicle system proceeds to operation 830.

At operation 830 the vehicle system increments the releasing timer ($D_{rls}$) by one implementation cycle ($T_s$), and resets the disabling timer by setting $D_{rls} = D_{rls} + T_s$ and $D_{dsbl} = 0$. At operation 832 the vehicle system determines if the brake effort releasing rate ($\dot{P}_{brk}$) is less than or equal to the brake pressure threshold rate ($p_i$). $p_i$ is a negative brake pressure threshold rate, therefore a positive determination at operation 816 ($\dot{P}_{brk} \leq p_i$) indicates that that the rate of change (slope) of $P_{brk}$ is decreasing. Such conditions are referenced by numeral 414 in FIG. 4. $p_i$ is less than negative brake pressure threshold rate $q_i$, and $q_i$ is less than or equal to zero ($p_i < q_i \leq 0$). Thus $p_i$ and $q_i$ provide a hysteresis region for timer count-up and reset decision making. If the determination at operation 832 is positive, the vehicle system proceeds to operation 834 and increments the releasing pattern timer ($D_{patn}$) by one implementation cycle ($T_s$), and resets the resetting timer ($D_{rst}$) by setting $D_{patn} = D_{patn} + T_s$ and $D_{rst} = 0$. If the determination at operation 832 is negative, the vehicle system proceeds to operation 836.

At operation 836 the vehicle system increments the resetting timer ($D_{rst}$) by one implementation cycle ($T_s$). At operation 838, the vehicle system determines if the resetting timer ($D_{rst}$) is greater than a resetting threshold value ($\lambda_{rst}$). If the determination at operation 838 is positive, then the vehicle system proceeds to operation 828 and disables the $D_{rls}$ timer. If the determination at operation 838 is negative, the vehicle system proceeds to operation 840.

At operation 840 the vehicle system evaluates a time elapsing ratio ($R_d$) and the releasing timer ($D_{rls}$), where $R_d = D_{patn}/D_{rls}$. The vehicle system determines if $R_d$ is less than a resetting threshold value ($\gamma_{rst}$) and if $D_{rls}$ is greater than or equal to a releasing threshold value ($d_i$). If both of these determinations are positive, then the vehicle system proceeds to operation 828 and disables the $D_{rls}$ timer. If the determination at operation 840 or operation 826 is negative, then the vehicle system proceeds to operation 842. The vehicle system also proceeds to operation 842 after operations 818, 820 and 834.

At operation 842 the vehicle system returns to operation 812. Additionally, at operation 842 the vehicle system provides output values determined by the method 810 to operation 622 of the method 610 shown in FIG. 6.

At operation 622, the vehicle system determines if a brake releasing pattern has been detected. In one or more embodiments, a brake releasing pattern is detected when all of the following brake release conditions are satisfied:

1. $P_{brk} \leq P_i^{thld}$ and $P_{brk} > P_{brk}^{epu}$;
2. $\delta \geq \sigma P_{brk}^{adp} > 0$;
3. $\dot{\delta} \geq \rho_\delta$;
4. $D_{rls} \geq d_i$ with respect to a threshold $p_i$ for $\dot{P}_{brk}$ condition; and
5. $R_d \geq \gamma_i$.

The first brake release state condition ($P_{brk} \leq P_i^{thld}$ and $P_{brk} > P_{brk}^{epu}$) relates to the present brake pressure level ($P_{brk}$). $P_i^{thld}$ represents a threshold brake pressure value, where the subscript i indicates the brake pressure region index. For the embodiment illustrated in FIG. 4, $P_{brk}$ is being evaluated at time $t_7$, where $P_{brk}$ is within the medium-low pressure region, therefore $P_i^{thld}$ is equal to $P_{brk}^{med}$. Thus the first condition is satisfied when $P_{brk} \leq P_{brk}^{med}$ and $P_{brk} > P_{brk}^{epu}$ which may be combined as $P_{brk}^{epu} < P_{brk} \leq P_{brk}^{med}$. The first condition is satisfied in the illustrated embodiment, because $P_{brk}$ within this region ($P_{brk}^{epu} < P_{brk} \leq P_{brk}^{med}$) at $t_7$.

The second brake release state condition ($\delta \geq \sigma P_{brk}^{adp} > 0$) relates to the difference between the brake pressure ($P_{brk}$) and the filtered brake pressure ($P_{brk}^{adp}$). $\delta$ represents the deviation displacement, and is calculated using equation 9 as shown below, based on $P_{brk}^{adp}$ that was determined by the method of FIG. 7:

$$\delta = P_{brk}^{adp} - P_{brk} \qquad (9)$$

This difference ($\delta$) is illustrated in FIG. 4 along time instance $t_7$. The variable $\sigma$ is a constant that represents a fractional value (e.g., $0 < \sigma < 1$). The second condition correlates $\delta$ to $P_{brk}^{adp}$.

The third brake release state condition ($\dot{\delta} \geq \rho_\delta$) relates to the rate of change of $P_{brk}$ and $P_{brk}^{adp}$. $\dot{\delta}$ represents the rate of change of the deviation ($\delta$) and is calculated using equation 10, as shown below:

$$\dot{\delta} = \dot{P}_{brk}^{adp} - \dot{P}_{brk} \qquad (10)$$

where $\dot{P}_{brk}^{adp}$ is the slope of the filtered brake pressure waveform and $\dot{P}_{brk}$ is the slope of the brake pressure waveform. Both $\dot{P}_{brk}^{adp}$ and $\dot{P}_{brk}$ are illustrated in FIG. 4. The variable $\rho_\delta$ is a constant value and the third condition ($\dot{\delta} \geq \rho_\delta$) is generally satisfied when $P_{brk}$ is decreasing rapidly, and referenced by numeral 416 in FIG. 4.

The fourth brake release state condition ($D_{rls} \geq d_i$) relates to the brake release timer strategy and was determined at operation 840 of the method 810 illustrated in FIG. 8. The fourth condition generally provides that the brake release state condition is true for a period of time that is long enough to filter out any unintentional brake releases dues to oscillation in $P_{brk}$. $D_{rls}$ is depicted in FIG. 4 as a period of time preceding $t_7$.

The fifth brake release state condition ($R_d \geq \gamma_i$) also relates to the brake release timer strategy. $R_d$ represents the time elapsing ratio ($R_d$), where $R_d = D_{patn}/D_{rls}$, and $\gamma_i$ is a ratio parameter, where the subscript i indicates the corresponding brake pressure region index. The fifth condition generally provides that the brake release state condition is true for a period of time that is long enough to filter out any unintentional brake releases dues to oscillation in $P_{brk}$. $D_{patn}$ is depicted in FIG. 4 as a period of time preceding $t_7$, and less than $D_{rls}$.

At operation 622, the vehicle system evaluates the five brake release state conditions to determine if a brake releasing pattern is detected. If the determination at operation 622 is negative (not all five conditions are satisfied), then the vehicle system proceeds to operation 616 and sets the vehicle launch request to false ($S_{vlr}$=FALSE). If the determination at operation 622 (all five conditions are satisfied), then the vehicle system proceeds to operation 624 and sets the vehicle launch request to true ($S_{vlr}$=TRUE). After operations 624 and 616 the vehicle system proceeds to operation 626, and then returns to operation 612. In other embodiments of the vehicle system, the vehicle launch request may be set to TRUE when less than all five conditions are satisfied. In one embodiment, the vehicle launch request is set to TRUE when $P_{brk} \leq P_{brk}^{epu}$.

After the vehicle launch request is set to TRUE, as described with respect to the method 610, the vehicle system restarts or "pulls-up" the engine. In one or more embodiments, the VSC provides the vehicle launch request to the ECM, which in turn restarts the engine.

Figure 9:
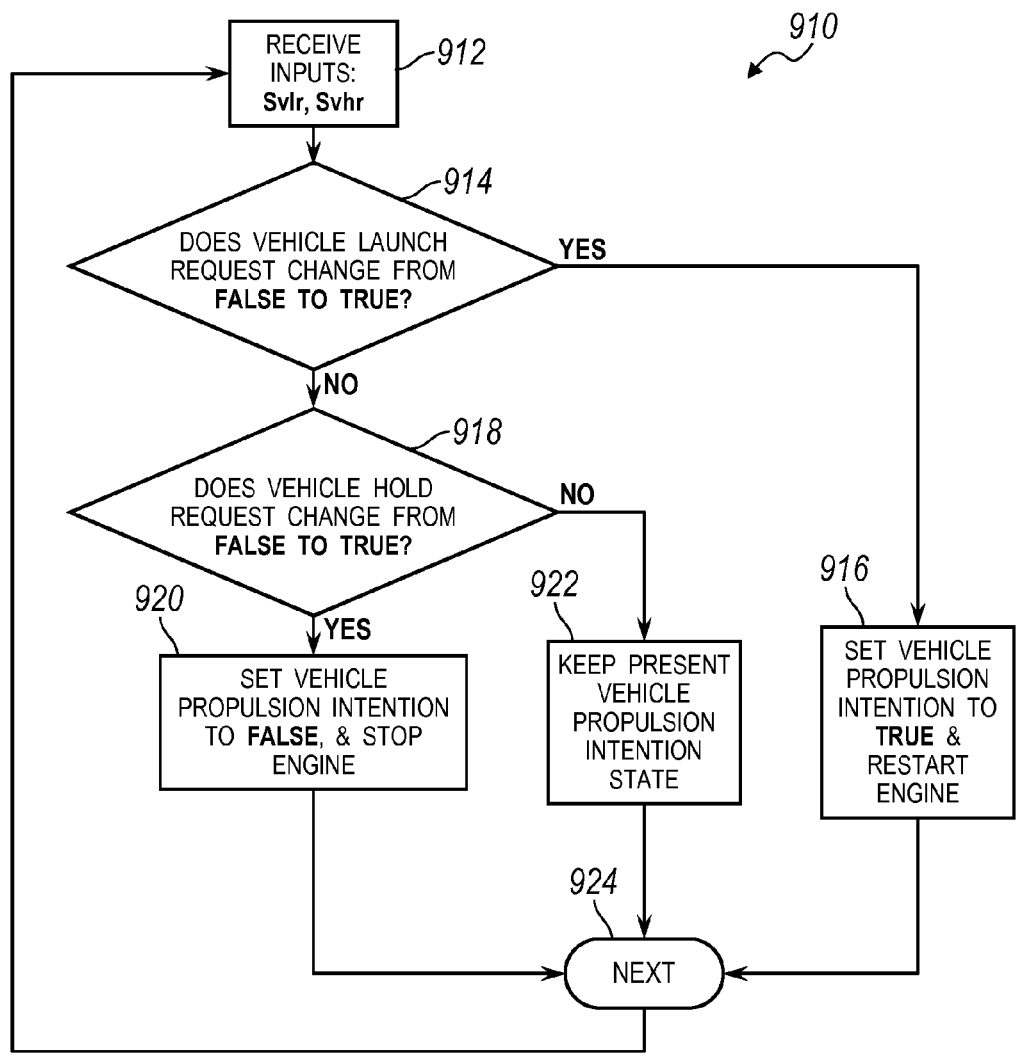
FIG. 9 is a flow chart illustrating a method for evaluating a vehicle propulsion intent based on brake apply and release characteristics according to one or more embodiments.

Referring to FIG. 9, a method for evaluating vehicle propulsion intent based on brake state conditions is illustrated according to one or more embodiments and generally referenced by numeral 910. The method 910 is implemented using software code contained within the ECM according to one or more embodiments. In other embodiments the software code is shared between multiple controllers (e.g., the VSC and the ECM).

At operation 912 the vehicle system receives inputs ($S_{vlr}$, and $S_{vhr}$). $S_{vlr}$ is the present vehicle launch request (TRUE or FALSE) that was determined by method 610 (FIG. 6). $S_{vhr}$ is the present vehicle hold request (TRUE or FALSE) that was determined by method 510 (FIG. 5).

At operation 914 the vehicle system compares the present vehicle launch request ($S_{vlr}$) to a prior vehicle launch request to determine if the vehicle launch request changed from FALSE to TRUE. The prior launch request is saved within the memory of the ECM according to one or more embodiments. If the determination at operation 914 is positive, then the vehicle system proceeds to operation 916. At operation 916 the vehicle system sets the vehicle propulsion intention ($S_{vpi}$) to TRUE and restarts or "pulls-up" the engine. If the determination at operation 914 is negative, then the vehicle system proceeds to operation 918.

At operation 918 the vehicle system compares the present vehicle hold request ($S_{vhr}$) to a prior vehicle hold request to determine if the vehicle hold request changed from FALSE to TRUE. The prior hold request is saved within the memory of the ECM according to one or more embodiments. If the determination at operation 918 is positive, then the vehicle system proceeds to operation 920. At operation 920 the vehicle system sets the vehicle propulsion intention ($S_{vpi}$) to FALSE and stops or "pulls-down" the engine. If the determination at operation 918 is negative, then the vehicle system proceeds to operation 922 and maintains the present vehicle propulsion intent state. After operations 916, 920 and 922 the vehicle system proceeds to operation 924, and then returns to operation 912.

As demonstrated by the embodiments described above, the vehicle, vehicle system, and method provide advantages over the prior art by anticipating a vehicle hold request based on an evaluation of a number of brake apply state conditions, and by anticipating a vehicle launch request based on an evaluation of a number of brake release state conditions. By evaluating a number of conditions concurrently, the system avoids unintended engine shutdowns and unintended engine restarts, which improves vehicle fuel economy as compared to existing systems.

While the best mode has been described in detail, those familiar with the art will recognize various alternative designs and embodiments within the scope of the following claims. Additionally, the features of various implementing embodiments may be combined to form further embodiments of the invention. While various embodiments may have been described as providing advantages or being preferred over other embodiments or prior art implementations with respect to one or more desired characteristics, those of ordinary skill in the art will recognize that one or more features or characteristics may be compromised to achieve desired system attributes, which depend on the specific application and implementation. These attributes may include, but are not limited to: cost, strength, durability, life cycle cost, marketability, appearance, packaging, size, serviceability, weight, manufacturability, ease of assembly, etc. The embodiments described herein that are described as less desirable than other embodiments or prior art implementations with respect to one or more characteristics are not outside the scope of the disclosure and may be desirable for particular applications. Additionally, the features of various implementing embodiments may be combined to form further embodiments of the invention.

What is claimed is:

1. A vehicle comprising:
   an engine; and
   a controller configured to shutdown the engine in response to brake pressure exceeding a first threshold and a rate of change of the brake pressure being greater than a rate of change threshold, and to restart the engine in response to brake pressure decreasing below a second threshold;
   wherein the first threshold and the second threshold are based on an estimated vehicle mass and a road gradient.

2. The vehicle of claim 1 wherein the controller is further configured to:
   shutdown the engine in response to receiving a no propulsion request for longer than a time threshold.

3. The vehicle of claim 2 wherein the no propulsion request further comprises:
   input indicative of a brake pedal being applied;
   input indicative of the brake pressure being greater than the first threshold; and
   input indicative of a rate of change of the brake pressure being greater than a rate of change threshold.

4. The vehicle of claim 1 wherein the controller is further configured to:
   restart the engine in response to brake pressure being less than a third threshold, and a difference between the brake pressure and a filtered brake pressure being greater than a deviation threshold;
   wherein the third threshold is greater than the first threshold, and wherein the third threshold corresponds to the brake pressure at which the engine was shutdown; and
   wherein the filtered brake pressure is greater than the brake pressure.

5. The vehicle of claim 1 wherein the controller is further configured to:
   restart the engine in response to a difference between the brake pressure and a filtered brake pressure being greater than a deviation threshold;
   wherein the filtered brake pressure is greater than the brake pressure.

6. The vehicle of claim 5 wherein the filtered brake pressure is based on the brake pressure and a variable bandwidth, the bandwidth varying based on a magnitude of the brake pressure and a rate of change of the brake pressure.

7. The vehicle of claim 5 wherein the controller is further configured to:
   restart the engine in response to a derivative of the difference between the brake pressure and the filtered brake pressure being greater than a derivative threshold value;

wherein the filtered brake pressure is greater than the brake pressure.

8. The vehicle of claim 1 wherein the controller is further configured to:
restart the engine in response to the brake pressure decreasing at a rate of change that is less than a negative rate of change threshold for longer than a releasing time threshold.

9. The vehicle of claim 1 wherein the controller is further configured to:
restart the engine in response to brake pressure decreasing below a third threshold, and a difference between the brake pressure and a filtered brake pressure is greater than a deviation threshold;
wherein the third threshold is greater than the first threshold, the third threshold defines an upper boundary for a medium-low brake pressure region, and the first threshold defines a lower boundary for the medium-low brake pressure region;
wherein the filtered brake pressure is based on the brake pressure and a narrow bandwidth in response to a magnitude of the brake pressure being within the medium-low brake pressure region and a rate of change of the brake pressure being less than a negative rate of change threshold.

10. A vehicle system comprising:
a controller configured to:
shutdown an engine in response to receiving a no propulsion request for longer than a time threshold and brake effort exceeding a first threshold, and
restart the engine in response to brake effort being less than a second threshold, wherein the second threshold is greater than the first threshold.

11. The vehicle system of claim 10 wherein the controller is further configured to:
receive input indicative of brake pressure that corresponds to the brake effort.

12. The vehicle system of claim 11 wherein the controller is further configured to:
restart the engine in response to the brake pressure decreasing at a rate of change that is less than a negative rate of change threshold for longer than a releasing time threshold.

13. A method for controlling automatic shutdown and restart of an engine, the method comprising:
shutting down the engine in response to brake pressure exceeding a first threshold, wherein the first threshold is based on an estimated vehicle mass and a road gradient; and
restarting the engine in response to brake pressure decreasing below a second threshold and the brake pressure decreasing at a rate of change that is less than a negative rate of change threshold for longer than a releasing time threshold.

14. The method of claim 13 further comprising:
restarting the engine in response to brake pressure decreasing below a third threshold and a difference between the brake pressure and a filtered brake pressure being greater than a deviation threshold, wherein the third threshold is greater than the first threshold, and wherein the third threshold corresponds to the brake pressure at which the engine was shutdown, and wherein the filtered brake pressure is greater than the brake pressure.

15. The method of claim 13 further comprising:
restarting the engine in response to a difference between the brake pressure and a filtered brake pressure being greater than a deviation threshold;
wherein the filtered brake pressure is greater than the brake pressure.

16. The method of claim 13 further comprising:
anticipating a vehicle launch request in response to the brake pressure decreasing below a third threshold and a difference between the brake pressure and a filtered brake pressure being greater than a deviation threshold, wherein the third threshold is greater than the first threshold, and wherein the third threshold corresponds to the brake pressure at which the engine was shutdown, and wherein the filtered brake pressure is greater than the brake pressure;
providing output indicative of a vehicle propulsion intent based on a change between the vehicle launch request and a previous vehicle launch request; and
restarting the engine in response to the vehicle propulsion intent.

* * * * *